United States Patent
Horie et al.

(10) Patent No.: US 11,338,233 B2
(45) Date of Patent: May 24, 2022

(54) AIR FILTER MEDIUM, FILTER PLEAT PACK, AND AIR FILTER UNIT

(71) Applicant: NITTO DENKO CORPORATION, Osaka (JP)

(72) Inventors: Yuri Horie, Osaka (JP); Masaaki Mori, Osaka (JP); Yukio Arimitsu, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 101 days.

(21) Appl. No.: 16/648,468

(22) PCT Filed: Sep. 21, 2018

(86) PCT No.: PCT/JP2018/035211
§ 371 (c)(1),
(2) Date: Mar. 18, 2020

(87) PCT Pub. No.: WO2019/059382
PCT Pub. Date: Mar. 28, 2019

(65) Prior Publication Data
US 2020/0230536 A1    Jul. 23, 2020

(30) Foreign Application Priority Data
Sep. 22, 2017    (JP) .............................. JP2017-182774

(51) Int. Cl.
*B01D 46/00*    (2022.01)
*B01D 46/24*    (2006.01)
(Continued)

(52) U.S. Cl.
CPC ..... *B01D 46/0005* (2013.01); *B01D 46/2403* (2013.01); *B01D 46/521* (2013.01);
(Continued)

(58) Field of Classification Search
CPC ............ B01D 46/0005; B01D 46/2403; B01D 46/0072; B01D 46/521; B01D 49/00;
(Continued)

(56) References Cited

U.S. PATENT DOCUMENTS 6,149,702 A    11/2000  Kawano et al.
6,214,093 B1    4/2001  Nabata et al.
(Continued)

FOREIGN PATENT DOCUMENTS

EP    1 090 676    4/2001
JP    2000-61280 A    2/2000
(Continued)

OTHER PUBLICATIONS

Machine translation of JP 2003-190749, published Jul. 8, 2003 (Year: 2003).*

(Continued)

*Primary Examiner* — Robert Clemente
(74) *Attorney, Agent, or Firm* — Greenblum & Bernstein, P.L.C.

(57) ABSTRACT

The air filter medium of the present invention is an air filter medium including a stack of a porous polytetrafluoroethylene (PTFE) membrane and an air-permeable support member, a repulsive force generated in the medium when the medium is compressed in a thickness direction thereof is equal to or greater than 30 kPa and equal to or less than 150 kPa at a compression ratio of 30%, and at least one main surface of the air filter medium is formed by the air-permeable support member and has a maximum coefficient of friction of 24 gf or less. The air filter medium of the present invention is an air filter medium that uses a porous PTFE membrane and in which a decrease in collection efficiency due to pleating is inhibited.

8 Claims, 5 Drawing Sheets

(51) Int. Cl.
  *B01D 46/52* (2006.01)
  *B01D 49/00* (2006.01)
  *B01D 71/36* (2006.01)
  *B01D 46/74* (2022.01)
(52) U.S. Cl.
  CPC ............ *B01D 46/74* (2022.01); *B01D 49/00* (2013.01); *B01D 71/36* (2013.01)
(58) Field of Classification Search
  CPC ............ B01D 71/36; B01D 2239/0654; B01D 2275/10; B01D 46/543
  See application file for complete search history.

(56) References Cited

U.S. PATENT DOCUMENTS

| | | | |
|---|---|---|---|
| 6,416,562 | B1 | 7/2002 | Shibuya et al. |
| 6,682,576 | B1 | 1/2004 | Kiyotani et al. |
| 2006/0057925 | A1 | 3/2006 | Auza et al. |
| 2018/0264392 | A1 | 9/2018 | Niki et al. |
| 2020/0002495 | A1* | 1/2020 | Niki .................. B01D 39/16 |

FOREIGN PATENT DOCUMENTS

| | | |
|---|---|---|
| JP | 2001-170461 A | 6/2001 |
| JP | 2002-66226 A | 3/2002 |
| JP | 2003-190749 A | 7/2003 |
| JP | 2004-990 | 1/2004 |
| JP | 2007-111697 A | 5/2007 |
| JP | 2008-197317 | 8/2008 |
| JP | 2017-64713 A | 4/2017 |
| JP | 2017-164680 A | 9/2017 |

OTHER PUBLICATIONS

Official Communication issued in International Bureau of WIPO Patent Application No. PCT/JP2018/035211, dated Dec. 18, 2018.
Extended European Search Report issued on the corresponding European Patent Application No. 18859909.6, dated Apr. 23, 2021.
Phoenix Tribology Ltd., "TE 37 Bowden-Leben Machine", dated Jul. 9, 2017 (see attached archived date).

* cited by examiner

AIR FILTER MEDIUM, FILTER PLEAT PACK, AND AIR FILTER UNIT

TECHNICAL FIELD

The present invention relates to an air filter medium using a porous polytetrafluoroethylene membrane, a filter pleat pack including the medium, and an air filter unit including the medium.

BACKGROUND ART

In recent years, porous polytetrafluoroethylene (hereinafter, referred to as "PTFE") membranes have been used in air filter media, particularly in media used in air filters for clean rooms that are used in the semiconductor industry, the pharmaceutical industry etc. An air filter medium using a porous PTFE membrane has features such as low self-dusting property and high chemical resistance as compared to a medium using glass fibers. In addition, when an air filter medium using a porous PTFE membrane is made into a ULPA filter (Ultra Low Penetration Air Filter), a low pressure loss of about ⅔ to ½ can be achieved with the same collection efficiency as compared to a medium using glass fibers. Patent Literatures 1 and 2 each disclose an air filter medium using a porous PTFE membrane and a method for producing the medium.

CITATION LIST

Patent Literature

Patent Literature 1: JP 2001-170461 A
Patent Literature 2: JP 2002-66226 A

SUMMARY OF INVENTION

Technical Problem

In an air filter medium, a porous PTFE membrane is normally laminated to a support member having air permeability (air-permeable support member), in order to reinforce the membrane to maintain a shape as the medium. In addition, the air filter medium is generally folded by pleating so as to have a continuous W-shape when viewed from the side, in order to ensure a filtration area that is as large as possible. The pleated air filter medium (hereinafter, referred to as "filter pleat pack" according to the name commonly used by those skilled in the art) is assembled to a frame and used as an air filter unit.

A porous PTFE membrane is a very thin membrane. Thus, even when the porous PTFE membrane is laminated to an air-permeable support member, pinholes may be formed by compressive force or shear force applied to the membrane during pleating. The air filter medium having pinholes formed therein does not meet predetermined performance due to leakage. With the medium having pinholes, typically the collection efficiency decreases. The air filter medium having a decreased collection efficiency is not suitable for use in a clean room.

By using a reciprocating pleating machine, formation of pinholes in a porous PTFE membrane during pleating can be inhibited. However, even when this processing machine is used, pinholes may be still formed. In addition, according to a study by the present inventors, even when pinholes are not formed, a phenomenon that the collection efficiency of the medium decreases after pleating is observed. Patent Literatures 1 and 2 do not describe anything about this phenomenon and its solution.

The present invention aims to provide an air filter medium that uses a porous PTFE membrane and in which a decrease in collection efficiency due to pleating is inhibited.

Solution to Problem

The present invention provides an air filter medium including a stack of a porous polytetrafluoroethylene (PTFE) membrane and an air-permeable support member, wherein
a repulsive force generated in the medium when the medium is compressed in a thickness direction thereof is equal to or greater than 30 kPa and equal to or less than 150 kPa at a compression ratio of 30%, and
at least one main surface of the air filter medium is formed by the air-permeable support member and has a maximum coefficient of friction of 24 gf or less.

According to another aspect, the present invention provides a filter pleat pack including an air filter medium folded in a pleated manner, wherein
the air filter medium is the air filter medium of the present invention.

According to still another aspect, the present invention provides an air filter unit including the filter pleat pack of the present invention and a frame supporting the filter pleat pack.

Advantageous Effects of Invention

In the air filter medium according to the present invention, the repulsive force generated in the medium when the medium is compressed in the thickness direction thereof is equal to or greater than 30 kPa and equal to or less than 150 kPa at a compression ratio (deformation ratio in a compression axis direction) of 30%. In a conventional air filter medium, the repulsive force at a compression ratio of 30% (hereinafter, referred to as "30%-compression repulsive force") exhibits a greater value. Here, in pleating, an air filter medium is compressed in the thickness direction thereof by a member of a pleating machine, and the compression ratio in this direction at that time is normally about 30%. That is, the 30%-compression repulsive force in the above range in the air filter medium of the present invention means that the medium has a high cushioning property in the thickness direction (is flexible in the thickness direction) during pleating as compared to the conventional air filter medium.

In addition to the above, in the air filter medium according to the present invention, at least one main surface (exposed surface) is formed by the air-permeable support member and has a maximum coefficient of friction of 24 gf or less. Since the at least one main surface is formed by the air-permeable support member, the member of the pleating machine can be brought into contact with the air-permeable support member, and not with the porous PTFE membrane, during pleating. Moreover, since the at least one main surface formed by the air-permeable support member has a maximum coefficient of friction of 24 gf or less, for example, a blade, of the pleating machine, that is pressed against the at least one main surface can be caused to more smoothly slide on the main surface.

As a pleating machine for an air filter medium, a reciprocating processing machine and a rotary processing machine are typical. In pleating using a reciprocating processing machine, a blade of the processing machine is pressed against the surface of a medium and slides on the surface. At that time, strong shear force is applied to the compressed medium. In addition, in pleating using a rotary processing machine, due to nipping when sending a medium into a roll raising mechanism, strong shear force is applied to the compressed medium. In another type of processing machine, strong shear force is similarly applied to a compressed medium. In the air filter medium according to the present invention, due to the above-described high cushioning property in the thickness direction and the maximum coefficient of friction of the surface on which a member, of a pleating machine, that comes into contact with the surface can move more smoothly, the shear force applied to the medium during pleating is relaxed or dispersed, and formation of pinholes due to penetration of fibers, which form the air-permeable support member, into the porous PTFE membrane, change in the shapes and variation in the distribution of the pores in the porous PTFE membrane that affect the collection efficiency as a medium, etc., can be inhibited. Accordingly, an air filter medium that uses a porous PTFE membrane and in which a decrease in collection efficiency due to pleating is inhibited is achieved.

DESCRIPTION OF EMBODIMENTS

Hereinafter, embodiments of the present invention will be described with reference to the drawings. The present invention is not limited to the embodiments described below.

[Air Filter Medium]

Figure 1:
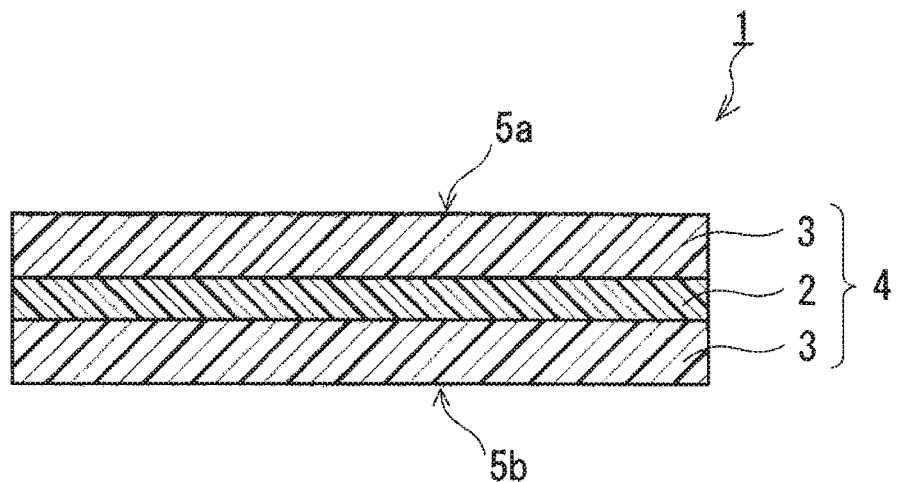
FIG. 1 is a cross-sectional view schematically showing an example of the air filter medium of the present invention.

FIG. 1 shows an example of the air filter medium of the present invention. An air filter medium 1 in FIG. 1 includes a stack 4 of one porous PTFE membrane 2 and two air-permeable support members 3. The two air-permeable support members 3 sandwich the porous PTFE membrane 2 therebetween. The porous PTFE membrane 2 and each air-permeable support member 3 are in contact with each other. In the air filter medium 1, the porous PTFE membrane 2 has a function of collecting an object to be collected. The object to be collected is, for example, dust in the air. Each air-permeable support member 3 has a function of reinforcing the porous PTFE membrane 2 to maintain a shape as the air filter medium 1. Each air-permeable support member 3 may further have a function as a pre-filter for collecting an object to be collected having a relatively large size. In addition, the stiffness required for pleating is provided to the air filter medium 1 by the air-permeable support members 3.

A 30%-compression repulsive force of the air filter medium 1 is equal to or greater than 30 kPa and equal to or less than 150 kPa. The upper limit of the 30%-compression repulsive force may be equal to or less than 140 kPa, equal to or less than 135 kPa, equal to or less than 130 kPa, equal to or less than 120 kPa, equal to or less than 110 kPa, equal to or less than 100 kPa, and even equal to or less than 90 kPa. If the 30%-compression repulsive force is excessively small, it is difficult for the air filter medium 1 to have the stiffness required for pleating. Thus, the lower limit of the 30%-compression repulsive force is set to 30 kPa.

The 30%-compression repulsive force of the air filter medium 1 can be measured as follows. A medium that is an object to be evaluated is cut out into squares having a side of 25 mm, and 10 to 20 cut-out pieces of the medium are stacked with the outer periphery of each medium piece aligned. The number of pieces to be stacked can be selected in accordance with the thickness of the medium. Next, a columnar compression element (diameter: 20 mm) with a weight of 12 g having a bottom surface as a compression surface is slowly placed on the uppermost surface of the stacked medium pieces. The compression element is placed such that the compression surface does not protrude from the uppermost surface of the stacked medium pieces in order to avoid the outer peripheral portion of the medium where the stacked state of the medium pieces is likely to be non-uniform and errors are likely to occur in measured values. Next, while a compression load is applied to the compression element in the thickness direction of the medium using a compression tester (for example, an autograph manufactured by Shimadzu Corporation) to compress the medium pieces, stress received by the compression element from the medium pieces by the compression is measured as the repulsive force of the medium. The compression speed is set to 0.5 mm/min. The repulsive force of the medium measured when the compression element is pushed into the medium pieces by a distance of 30% of a thickness d0 of the entirety of the stacked medium pieces with the position of the compression element at the time when a load of 0.1 N is applied to the uppermost surface of the medium pieces without considering the mass of the compression element, as a reference position, can be regarded as the 30%-compression repulsive force. Measurement of the 30%-compression repulsive force of the air filter medium 1 in an already pleated state such as a state of being incorporated into an air filter unit or a state as a filter pleat pack is preferably performed on a medium cut out from a center portion of the air filter medium 1, not from an end portion of the air filter medium 1, for example, not from a peripheral portion of the filter pleat pack. This is because, on a medium cut out from an end portion, the 30%-compression repulsive force may fluctuate due to strong influence during pleating and/or production of an air filter unit.

In the air filter medium 1 shown in FIG. 1, both main surfaces (exposed surfaces) 5a and 5b are formed by the air-permeable support members 3. At least one selected from the main surface 5a and the main surface 5b, preferably both the main surface 5a and the main surface 5b, have a maximum coefficient of friction of 24 gf or less. The maximum coefficient of friction may be equal to or less than 23 gf and even equal to or less than 20 gf. The lower limit of the maximum coefficient of friction is, for example, 2 gf. Regarding the main surface of the air filter medium 1 having a maximum coefficient of friction in these ranges, for example, the frictional resistance when a blade of a pleating machine slides on the main surface is small, and thus the shear force applied to the porous PTFE membrane 2 through the air-permeable support member 3 due to the friction with the sliding blade can be reduced. In the air filter medium of the present invention, at least one main surface only has to be formed by the air-permeable support member 3 and have a maximum coefficient of friction of 24 gf or less. The effects of the present invention are achieved by pressing the blade of the pleating machine against the main surface in pleating. To more reliably obtain the effects of the present invention, both main surfaces of the medium are preferably formed by the air-permeable support members 3 and have a maximum coefficient of friction of 24 gf or less.

The maximum coefficient of friction of each main surface of the air filter medium 1 can be measured by a Bowden-Leben friction test method using a Bowden-Leben type friction tester under the following conditions. The maximum coefficient of friction means the maximum value of the coefficient of friction (including both the coefficient of static friction and the coefficient of dynamic friction) measured by the above test method.

Shape of medium (test piece): 5 cm×10 cm rectangle
Gauge head: steel ball with a diameter of 10 mm specified in the Japanese Industrial Standards (hereinafter, referred to as "JIS") B1501: 2009
Sliding direction of gauge head: long side direction of rectangular test piece
Sliding speed of gauge head: 700 mm/min
Sliding distance of gauge head: 40 mm
Measurement load: 100 gf In the air filter medium 1, the shear force (including force applied to the medium 1 due to nipping) applied to the air filter medium 1 during pleating is relaxed or dispersed due to the above-described high cushioning property in the thickness direction and the maximum coefficient of friction of the surface on which a member of the pleating machine that comes into contact with the surface can move more smoothly. Accordingly an air filter medium that uses the porous PTFE membrane 2 and in which a decrease in collection efficiency due to pleating is inhibited is achieved. The decrease in collection efficiency inhibited in the air filter medium 1 includes not only a decrease in collection efficiency brought by pinholes formed in the porous PTFE membrane due to pleating but also a decrease in collection efficiency that can occur even when pinholes are not formed.

In Patent Literature 1, heat lamination of a porous PTFE membrane and an air-permeable support member using a heat roll is assumed, and an air-permeable support member having a high surface density is used in order to obtain an air filter medium having a low pressure loss and a high collection efficiency. By using the air-permeable support member having a high surface density, the surface density of the air filter medium also becomes high. However, even when the surface density of the air filter medium is high, it does not mean that the pressure applied to the medium during pleating is relaxed and dispersed. In the air filter medium according to the present invention, even when the surface density of the medium is low, a decrease in collection efficiency due to pleating is inhibited. This means that an air-permeable support member having a low surface density can be used in the air filter medium of the present invention. Thus, in the air filter medium according to the present invention, it is possible to achieve both a high collection efficiency and a low pressure loss at a higher level, and the production cost of the medium can be reduced.

The surface density of the air filter medium 1 is, for example, equal to or greater than 55 g/m$^2$ and equal to or less than 95 g/m$^2$. The upper limit of the surface density of the air filter medium 1 may be equal to or less than 80 g/m$^2$, less than 80 g/m$^2$, equal to or less than 75 g/m$^2$, and even equal to or less than 70 g/m$^2$. The surface density of the air filter medium 1 may be equal to or greater than 55 g/m$^2$ and equal to or less than 75 g/m$^2$. In the air filter medium 1, even when the medium has these surface densities, a decrease in collection efficiency due to pleating is inhibited.

The air filter medium 1 has, for example, the characteristics described below.

A PF (Performance Factor) value of the air filter medium 1 is, for example, equal to or greater than 23, and may be equal to or greater than 25, equal to or greater than 27, or even equal to or greater than 30 depending on the configuration of the air filter medium 1. The PF value is a value serving as an index of collection performance in the air filter medium. The higher the PF value is, the higher the collection performance of the air filter medium 1 is. The air filter medium 1 having a PF value of 23 or greater can be used as a medium for an air filter used in a clean room in the semiconductor industry, the pharmaceutical industry, etc.

The PF value is a value obtained by the following equation (1) from a pressure loss PL (unit: mmH$_2$O) of the medium at a permeate flow rate of 5.3 cm/sec (permeated gas is air) and a collection efficiency CE (unit: %) of the medium measured at a permeate flow rate of 5.3 cm/sec (permeated gas is air) using polyalphaolefin particles having a particle diameter of 0.10 to 0.20 μm.

$$\text{PF value}=\{-\log\,[(100-CE)/100]/PL\}\times100 \quad (1)$$

The pressure loss PL of the air filter medium 1 is, for example, 10 to 400 Pa, and may be 100 to 400 Pa and even 150 to 350 Pa depending on the configuration of the air filter medium 1.

The pressure loss PL of the air filter medium 1 can be measured as follows. A medium that is an object to be evaluated is set to a holder having a vent hole (with a circular shape and an effective area of 100 cm$^2$) such that the object to be evaluated closes the vent hole. Next, in a state where it is possible for air to pass only through the object to be evaluated within the vent hole, a pressure difference is generated between one surface and the other surface of the holder. Then, the pressure difference when the linear flow rate of the air passing through the object to be evaluated reaches 5.3 cm/sec as measured by a flow meter is measured by a pressure gauge (manometer). The pressure difference is measured eight times for one object to be evaluated, and the average value of the pressure differences can be regarded as the pressure loss PL of the air filter medium 1 that is the object to be evaluated.

The collection efficiency CE of the air filter medium 1 is, for example, 20 to 100%, and may be 90 to 100% and even 99.9 to 100% depending on the configuration of the air filter medium 1. The air filter medium 1 may be a HEPA filter (High-Efficiency Particulate Air Filter) specified in JIS Z8122: 2000, or may be a ULPA filter.

The collection efficiency CE of the air filter medium 1 can be measured as follows. A medium that is an object to be evaluated is set to a holder having a vent hole (with a circular shape and an effective area of 100 cm$^2$) such that the object to be evaluated closes the vent hole. Next, in a state where it is possible for air to pass only through the object to be evaluated within the vent hole, a pressure difference is generated between one surface and the other surface of the holder. Next, the pressure difference is adjusted such that the linear flow rate of the air passing through the object to be evaluated is maintained at 5.3 cm/sec as measured by a flow meter, and then polyalphaolefin particles having a particle diameter of 0.10 to 0.20 μm (average particle diameter: 0.15 μm) are included at a concentration (upstream particle concentration) of 4×10$^8$ particles/L or more in the air to be caused to pass through the object to be evaluated. Then, the concentration (downstream particle concentration) of the polyalphaolefin particles included in the air having passed through the object to be evaluated is measured using a particle counter disposed downstream of the object to be evaluated, and the collection efficiency CE of the air filter medium 1 that is the object to be evaluated can be obtained by the following equation (2) from the upstream particle concentration and the downstream particle concentration.

$$\text{Collection efficiency CE} = [1 - (\text{downstream particle concentration})/(\text{upstream particle concentration})] \times 100(\%) \quad (2)$$

The porous PTFE membrane 2 may be a known porous PTFE membrane that is included in a conventional air filter medium. The porous PTFE membrane 2 is typically formed from countless PTFE fibrils, which are fine fibrous structures. The porous PTFE membrane 2 may have PTFE nodes connected to the PTFE fibrils.

The porous PTFE membrane 2 can be obtained, for example, by molding a mixture of unsintered PTFE powder and a liquid lubricant into a film by a method such as extrusion and/or rolling, removing the liquid lubricant from the obtained unsintered film, and then stretching the unsintered film to make the unsintered film into a porous form. However, the method for producing the porous PTFE membrane 2 is not limited to this example as long as collection performance corresponding to the intended use of the air filter medium 1 is obtained. In the above example, at any timing after the formation of the unsintered film, the film may be sintered by heating the film to a temperature equal to or higher than the melting point of PTFE, and the membrane strength can be increased by the sintering. The sintering can be carried out, for example, after the unsintered film is stretched. Examples of the liquid lubricant include hydrocarbon oils such as naphtha, white oil, and liquid paraffin. However, the liquid lubricant is not limited to the above examples as long as the liquid lubricant can wet the surfaces of the PTFE particles and can be removed later. An example of stretching for making into a porous form is biaxial stretching that is a combination of stretching at a stretch ratio of 2 to 60 times in an MD direction (longitudinal direction) of an unsintered sheet and a stretching temperature of 150 to 390° C. and stretching at a stretch ratio of 10 to 60 times in a TD direction (width direction) of the sheet and a stretching temperature of 40 to 150° C. However, the stretching for making into a porous form is not limited to this example.

The thickness of the porous PTFE membrane 2 is, for example, 1 to 100 μm. The average pore diameter of the porous PTFE membrane 2 is, for example, 0.1 to 50 μm.

The porosity of the porous PTFE membrane 2 is, for example, 70 to 98%. Such a high porosity contributes to the low pressure loss and the high collection efficiency of the air filter medium 1 including the porous PTFE membrane 2. The porosity of the porous PTFE membrane 2 can be measured as follows. A porous PTFE membrane that is an object to be measured is cut out into a certain size (for example, a circular shape having a diameter of 6 cm), and the volume and mass of the cut-out membrane are obtained. The porosity of the porous PTFE membrane can be calculated by substituting the obtained volume and mass into the following equation (3). In the equation (3), V (unit: cm$^3$) is the volume, W (unit: g) is the mass, and D (unit: g/cm$^3$) is the true density of PTFE.

$$\text{Porosity }(\%) = 100 \times [V - (W/D)]/V \quad (3)$$

The surface density of the porous PTFE membrane 2 is, for example, 0.05 to 10 g/m$^2$, and may be 0.1 to 5 g/m$^2$ and even 0.3 to 3 g/m$^2$.

The PF value, the pressure loss, and the collection efficiency of the porous PTFE membrane 2 can fall into the same ranges as those for the PF value, the pressure loss, and the collection efficiency of the air filter medium 1, respectively. The pressure loss and the collection efficiency of the porous PTFE membrane 2 can be measured by the same methods as those for measuring the pressure loss and the collection efficiency of the air filter medium 1, with the object to be evaluated being changed to the porous PTFE membrane.

Each air-permeable support member 3 is a layer having high air permeability in the thickness direction as compared to the porous PTFE membrane 2. The air-permeable support member 3 is formed from, for example, a non-woven fabric, woven fabric, or mesh formed from fibers such as short fibers and long fibers. However, the air-permeable support member 3 is not limited to this example. The air-permeable support member 3 is preferably formed from a non-woven fabric, since the non-woven fabric has excellent air permeability strength, flexibility, and workability and the above-described ranges of the 30%-compression repulsive force and the maximum coefficient of friction of the surface are satisfied more easily than other materials.

Examples of the material forming the air-permeable support member 3 include: polyolefins such as polyethylene (PE) and polypropylene (PP); polyesters such as polyethylene terephthalate (PET); polyamides including aromatic polyamides; and composite materials thereof. The air-permeable support member 3 may contain two or more of these materials. Since the joining property with the porous PTFE membrane 2 is high, the material is preferably a polyolefin and more preferably PE. When the material is a composite material, a polyolefin, particularly PE, is preferably exposed on the surface, of the air-permeable support member 3, that is joined to the porous PTFE membrane 2. The material forming the air-permeable support member 3 is not limited to the above example.

An example of a composite material that can form the air-permeable support member 3 is composite fibers having a core-sheath structure that has a core and a sheath formed from materials different from each other and in which the core is covered with the sheath. In the composite fibers, the melting point of the material forming the sheath is preferably lower than the melting point of the material forming the core. Examples of the material forming the core include polyesters such as PET. Examples of the material forming the sheath include polyolefins such as PE.

The average fiber diameter of the fibers that can form the air-permeable support member 3 is, for example, 1 to 50 μm, and may be 1 to 30 μm and even 10 to 30 μm.

The surface density of the air-permeable support member 3 is, for example, equal to or greater than 20 g/m$^2$ and equal to or less than 70 g/m$^2$. The upper limit of the surface density of the air-permeable support member 3 may be equal to or less than 50 g/m$^2$, equal to or less than 40 g/m$^2$, less than 40 g/m$^2$, and even equal to or less than 35 g/m$^2$. The lower limit of the surface density of the air-permeable support member 3 may be equal to or greater than 25 g/m$^2$.

In the air filter medium 1, the porous PTFE membrane 2 and each air-permeable support member 3 are joined to each other. Examples of the method for joining the porous PTFE membrane 2 and each air-permeable support member 3 include heat lamination and lamination with an adhesive. However, the method for joining the porous PTFE membrane 2 and each air-permeable support member 3 is not limited to the examples. The porous PTFE membrane 2 and each air-permeable support member 3 are preferably joined to each other by heat lamination, since an increase in pressure loss at a joined portion can be inhibited.

The air filter medium 1 shown in FIG. 1 is a medium with a three-layer structure including one porous PTFE membrane 2 and two air-permeable support members 3 that sandwich the porous PTFE membrane 2 therebetween. The number of porous PTFE membranes 2 and air-permeable support members 3 that can be included in the air filter medium of the present invention is not limited. For example, the air filter medium of the present invention may be a medium with a two-layer structure including one porous PTFE membrane 2 and one air-permeable support member 3. The air filter medium of the present invention may include two or more porous PTFE membranes 2. In addition, the air filter medium of the present invention may include two or more air-permeable support members 3. In this case, both main surfaces of the air filter medium are preferably formed by the air-permeable support members 3. The air filter medium of the present invention preferably has a multilayer structure including three or more layers.

Figure 2:
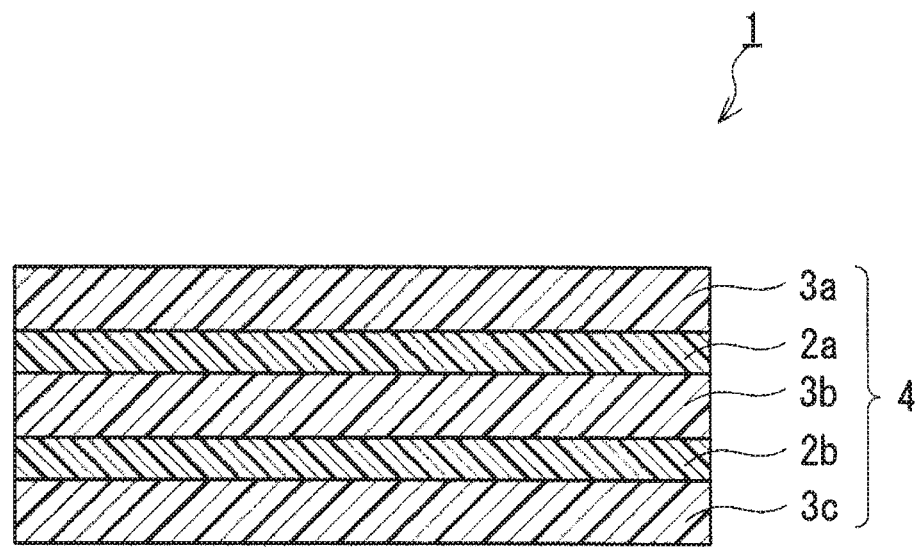
FIG. 2 is a cross-sectional view schematically showing another example of the air filter medium of the present invention.

FIG. 2 shows another example of the air filter medium of the present invention. An air filter medium 1 shown in FIG. 2 includes two porous PTFE membranes 2a and 2b and three air-permeable support members 3a, 3b, and 3c. The porous PTFE membranes and the air-permeable support members are stacked on each other in the order of the air-permeable support member 3a, the porous PTFE membrane 2a, the air-permeable support member 3b, the porous PTFE membrane 2b, and the air-permeable support member 3c. Both main surfaces of the air filter medium 1 shown in FIG. 2 are formed by the air-permeable support members 3a and 3c and have a maximum coefficient of friction of 24 gf or less. The air filter medium 1 shown in FIG. 2 is a medium with a five-layer structure.

Both outermost layers of each of the air filter media 1 shown in FIGS. 1 and 2 are the air-permeable support members 3.

In the case where the air filter medium of the present invention includes two or more porous PTFE membranes 2, there may be a portion where the porous PTFE membranes 2 are continuously stacked. Similarly, in the case where the air filter medium of the present invention includes two or more air-permeable support members 3, there may be a portion where the air-permeable support members 3 are continuously stacked. In the case where the air filter medium of the present invention includes two or more porous PTFE membranes 2, the configurations of the two or more porous PTFE membranes 2 may be the same or different from each other. In the case where the air filter medium of the present invention includes two or more air-permeable support members 3, the configurations of the two or more air-permeable support members 3 may be the same or different from each other.

The air filter medium 1 may include a layer and/or a member other than the porous PTFE membranes 2 and the air-permeable support members 3 as long as the effects of the present invention are obtained.

The air filter medium of the present invention can be used in the same application as a conventional air filter medium. Examples of the application include application to air filter units used in clean rooms in the semiconductor industry, the pharmaceutical industry, etc. However the application of the air filter medium of the present invention is not limited to the above examples.

The air filter medium of the present invention can be produced, for example, by stacking the porous PTFE membrane 2 and the air-permeable support member 3 by various lamination methods such as heat lamination and adhesive lamination such that the above 30%-compression repulsive force and maximum coefficient of friction are achieved. More specifically the air filter medium of the present invention can be produced, for example, by stacking the porous PTFE membrane 2 and the air-permeable support member 3 by a heat lamination method A described below. However, the method for producing the air filter medium of the present invention is not limited to the above example.

The heat lamination method A includes, for example, steps described in the following (1) to (3).

(1) The porous PTFE membrane 2 and the air-permeable support member 3 are stacked. The number and order of porous PTFE membranes 2 and air-permeable support members 3 to be stacked are not limited. In accordance with the number and order of porous PTFE membranes 2 and air-permeable support members 3 stacked in an air filter medium 1 to be obtained, the porous PTFE membranes 2 and the air-permeable support members 3 can be stacked. In the case of obtaining an air filter medium 1 by performing lamination of the porous PTFE membrane 2 and the air-permeable support member 3 a plurality of times, the number and order of porous PTFE membranes 2 and air-permeable support members 3 to be stacked may be determined such that the air filter medium 1 is obtained by performing the lamination the plurality of times.

(2) A stack obtained by stacking the porous PTFE membrane 2 and the air-permeable support member 3 is heated in a non-contact manner. The heating is performed at least on the air-permeable support member 3. The heating temperature (the temperature which the air-permeable support member 3 reaches by the heating) is equal to or higher than the softening point of a joining component, to be joined to the porous PTFE membrane 2, included in the air-permeable support member 3, and is preferably equal to or higher than the melting point of the component. In the case where the air-permeable support member 3 is composed of a single component, the joining component is this component, and, in the case where the air-permeable support member 3 is composed of a plurality of components, the joining component is a component jointed to the porous PTFE membrane 2 in the obtained air filter medium 1. In the case where the air-permeable support member 3 is composed of fibers, the joining component is a resin contained in the fibers. In the case where the fibers have a core-sheath structure, the joining component may be a component of a sheath. The heating method is not limited as long as the air-permeable support member 3 can be heated in a non-contact manner, and examples of the heating method include infrared heating and hot air heating. In the case where the air-permeable support members 3 are exposed on both surfaces of the stack, both air-permeable support members 3 may be heated, or only one of the air-permeable support members 3 may be heated. In the case of heating both air-permeable support members 3, the air-permeable support members 3 may be heated at the same timing or may be heated at different times. In the case where the porous PTFE membrane 2 is exposed, the membrane 2 does not have to be heated. When the softening point of the joining component is not clear (for example, when it is difficult to measure the softening point with a thermomechanical analyzer (TMA) or when it is difficult to evaluate changes in physical properties that can be recognized as a Vicat softening point), a thermal deformation temperature (for example, a deflection temperature under load specified in JIS K7191) can be used as a reference instead of the softening point.

(3) A low pressure is applied to the heated air-permeable support member 3 in a direction in which the air-permeable support member 3 is to be jointed to the porous PTFE membrane 2, at a temperature equal to or higher than the softening point of the joining component included in the air-permeable support member 3 and lower than the melting point of the joining component. Through the steps (2) and (3), the porous PTFE membrane 2 and the air-permeable support member 3 are heat-laminated.

The heat lamination method A can include any step other than the steps (1) to (3) as long as the air filter medium of the present invention can be produced.

With the heat lamination method A, the air filter medium 1 which is a band-shaped object (long object) can be stably produced. That is, the heat lamination method A is applicable to industrial production of the air filter medium 1. In the case of producing the air filter medium 1 which is a band-shaped object, performing the steps (1) to (3) by using rolls to convey the porous PTFE membrane 2 and the air-permeable support member 3, which are band-shaped objects, is feasible.

Figure 3:
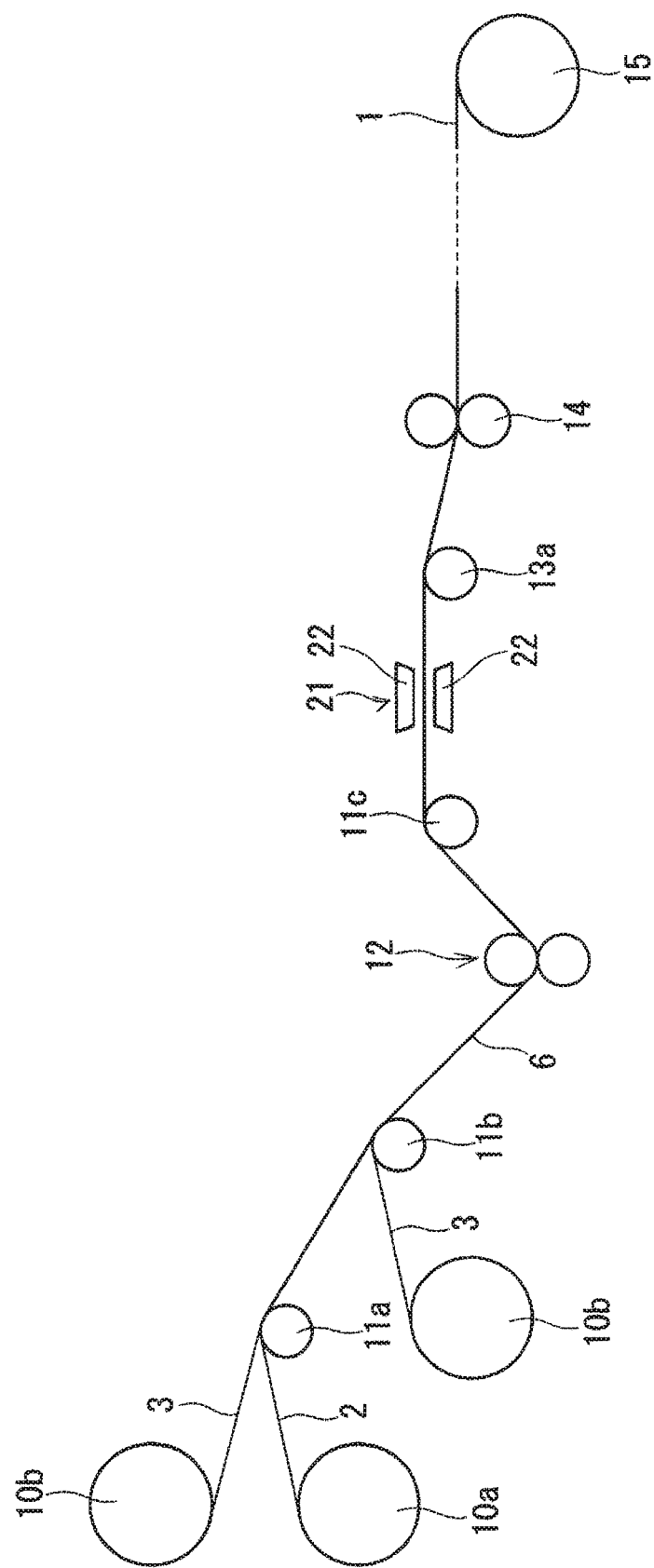
FIG. 3 is a schematic diagram showing an example of a method for producing the air filter medium of the present invention.

An example of production of the air filter medium 1, which is a band-shaped object, by the heat lamination method A will be described with reference to FIG. 3. The example shown in FIG. 3 is merely an example, and the method for producing the medium 1, which is a band-shaped object, by the heat lamination method A is not limited to this example.

The band-shaped porous PTFE membrane 2 is sent out from a feed roll 10a, the band-shaped air-permeable support members 3 are sent out from two feed rolls 10b, respectively, and the porous PTFE membrane 2 and the air-permeable support members 3 are stacked at guide rolls 11a and 11b to obtain a band-shaped stack 6 in which the air-permeable support member 3, the porous PTFE membrane 2, and the air-permeable support member 3 are stacked in this order (step (1)). The stack 6 passes through the first nip rolls 12 and is conveyed through a guide roll 11c to a heating device 21. The temperatures of the guide rolls 11a and 11b and the nip rolls 12 (the temperatures of the surfaces thereof brought into contact with the stack 6) and the temperature of the stack 6 are each maintained at a temperature lower than the softening point of the joining component of the air-permeable support member 3, typically at normal temperature. The guide roll 11c located immediately before the heating device 21 can be preheated as necessary. The preheating temperature is, for example, equal to or lower than the melting point of the joining component of the air-permeable support members 3.

Next, the air-permeable support members 3 are heated in a non-contact manner by the heating device 21 to a temperature equal to or higher than the softening point of the joining component (step (2)). The air-permeable support members 3 may be heated to a temperature equal to or higher than the melting point of the joining component. In the example shown in FIG. 3, the air-permeable support members 3 which form both exposed surfaces of the stack 6 are heated by passing the stack 6 through the space between a pair of infrared sources 22 disposed opposite to each other. The upper limit of the heating temperature is not limited and is, for example, a temperature higher than the melting point by 10 to 40° C.

Next, the stack 6 having passed through the heating device 21 passes through a first cooling roll 13a at a temperature equal to or higher than the softening point of the joining component and lower than the melting point of the joining component. When the stack 6 passes through the roll 13a, a pressure is applied to the stack 6 in the thickness direction of the stack 6, whereby the porous PTFE membrane 2 and the air-permeable support members 3 are heat-laminated and the air filter medium 1 is formed (step (3)). If the stack 6 passes through the first cooling roll 13a at a temperature equal to or higher than the melting point of the joining component, the air-permeable support members 3 softened by the high temperature are strongly compressed in the thickness direction, so that, the cushioning property in the thickness direction in the obtained air filter medium may decrease and a 30%-compression repulsive force of 150 kPa or less cannot be obtained in some cases. Meanwhile, if the stack 6 passes through the first cooling roll 13a at a temperature lower than the softening point of the joining component, heat lamination of the porous PTFE membrane 2 and the air-permeable support members 3 may be unreliable.

The temperature of the surface, of the first cooling roll 13a, that is brought into contact with the stack 6 may be controlled to a temperature equal to or higher than the softening point of the joining component and lower than the melting point of the joining component. If the temperature of the surface, of the first cooling roll 13a, that is brought into contact with the stack 6 is excessively high, for example, equal to or higher than the melting point of the joining component, the temperature of the air-permeable support member 3 when passing through the roll 13a may become equal to or higher than the melting point of the joining component, and thus fluffing may occur on the surface of the air-permeable support member 3. Meanwhile, if the temperature of the first cooling roll 13a is excessively low, for example, lower than the softening point of the joining component, the temperature of the air-permeable support member 3 when passing through the roll 13a may become lower than the softening point of the joining component. In addition, if the temperature of the first cooling roll 13a is excessively low, the temperature of the air near the cooling roll 13a may excessively decrease, and thus heat lamination of the porous PTFE membrane 2 and the air-permeable support members 3 may be unreliable.

Figure 4:
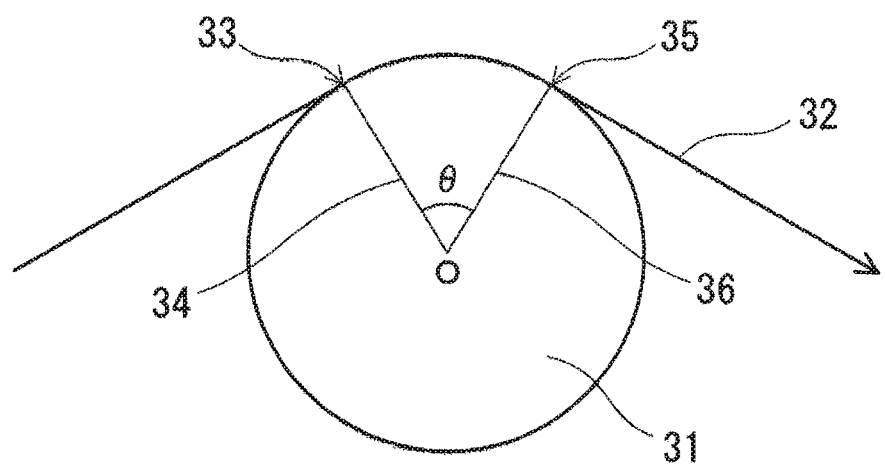
FIG. 4 is a schematic diagram for describing a holding angle θ of a conveyance object to a roll.

In order not to excessively increase the pressure applied in the thickness direction of the stack 6 when passing through the first cooling roll 13a, a holding angle θ of the stack 6 at the roll 13a is preferably 10 to 90 degrees and more preferably 10 to 45 degrees. As shown in FIG. 4, when a line segment 34 connecting the center O of the roll 31 and a point 33 at which a conveyance object 32 comes into contact with the roll 31 and a line segment 36 connecting the center O of the roll 31 and a point 35 at which the conveyance object 32 is separated from the roll 31 are considered, the holding angle θ, at the roll, of the band-shaped conveyance object passing through the roll is an angle formed by the line segment 34 and the line segment 36.

In the example shown in FIG. 3, the stack 6 passes through one first cooling roll 13a. The stack 6 may pass through a plurality of first cooling rolls 13a. By passing through the plurality of first cooling rolls 13a, for example, even when the conveyance speed of the stack 6 is high, the porous PTFE membrane 2 and the air-permeable support members 3 can be more reliably heat-laminated.

Next, the stack 6 having passed through the first cooling roll 13a passes through second nip rolls 14. The temperature of the stack 6 when passing through the second nip rolls 14 is preferably lower than the softening point of the joining component and is more preferably normal temperature. In this case, compression of the air-permeable support members 3 at the time of passing through the second nip rolls 14 is inhibited, and thus the cushioning property in the thickness direction in the obtained air filter medium 1 can be more reliably ensured. To cause the temperature of the stack 6 when passing through the second nip rolls 14 to be lower than the softening point of the joining component, a second cooling roll 13b for causing the temperature of the stack 6 to be a temperature lower than the softening point of the joining component may be further disposed between the first cooling roll 13a and the second nip rolls 14, and the stack 6 may be passed through the second cooling roll 13b (see FIG. 5). The temperature of the surface, of the second cooling roll 13b, that is brought into contact with the stack 6 may be controlled to a temperature lower than the softening point of the joining component. In addition, in order not to excessively increase the pressure applied in the thickness direction of the stack 6 when passing through the second cooling roll 13b in which residual heat may remain, a holding angle θ of the stack 6 at the roll 13b may be controlled in the same manner as the holding angle θ of the stack 6 at the first cooling roll 13a.

In the case where the second cooling roll 13b is further disposed, the stack 6 may pass through a plurality of second cooling rolls 13b. In the example shown in FIG. 5, the stack 6 passes through one second cooling roll 13b.

In the heat lamination method A in which conveyance of the porous PTFE membrane 2 and the air-permeable support members 3 which are band-shaped objects is used, the first and second nip rolls 12 and 14 can be omitted. However, by disposing the first and second nip rolls 12 and 14 with the heating device 21 and the first cooling roll 13a located therebetween on the conveyance path of the stack 6 as in the examples shown in FIGS. 3 and 5, it is made possible to control the conveyance speed and the conveyance tension of the stack 6 in a heating section, for the stack 6, that is located between the first nip rolls 12 and the second nip rolls 14 (section for heating to a temperature equal to or higher than the softening point of the joining component). As the conveyance tension to the stack 6 increases, the compressive force applied in the thickness direction to the air-permeable support members 3 during heat lamination increases. That is, when the first and second nip rolls 12 and 14 are disposed, the compressive force applied in the thickness direction to the air-permeable support members 3 during heat lamination can be controlled. More specifically, for example, a speed ratio v2/v1 of a conveyance speed v2 of the stack 6 by the second nip rolls 14 to a conveyance speed v1 of the stack 6 by the first nip rolls 12 may be controlled. The compressive force applied in the thickness direction to the air-permeable support members 3 during heat lamination can be decreased by decreasing the conveyance tension to the stack 6 as the speed ratio v2/v1 is decreased.

The speed ratio v2/v1 may be controlled to be, for example, equal to or greater than 0.9 and equal to or less than 1.1, and may be controlled to be equal to or greater than 0.9 and equal to or less than 1.0, and even equal to or greater than 0.9 and less than 1.0. A speed ratio less than 1.0 means that the conveyance speed of the stack 6 by the second nip rolls 14 located at the rear side on the conveyance path of the stack 6 is lower than the conveyance speed of the stack 6 by the first nip rolls 12 located at the front side on the conveyance path. However, the air-permeable support members 3, particularly, the air-permeable support members 3 formed from a non-woven fabric, shrink in the longitudinal direction by heating, and thus, when the speed ratio is less than 1.0, slack does not constantly occur in the stack 6 in the heating section.

The stack 6 having passed through the second nip rolls 14 is wound as the air filter medium 1 on a winding roll 15.

The obtained air filter medium 1 can be subjected to any processing as necessary. The processing is, for example, pleating. By the pleating, the air filter medium 1 is made into a filter pleat pack that is folded so as to have a continuous W-shape as viewed from the side.

The method for pleating the air filter medium 1 is not limited, and a known method can be used for pleating. The pleating can be performed, for example, using a reciprocating processing machine, by continuously folding the medium 1 along mountain folds and valley folds arranged alternately in parallel on the surface of the air filter medium 1. The air filter medium 1 may be pleated using a rotary processing machine. In the air filter medium 1, a decrease in collection efficiency during pleating can be inhibited.

[Filter Pleat Pack]

Figure 6:
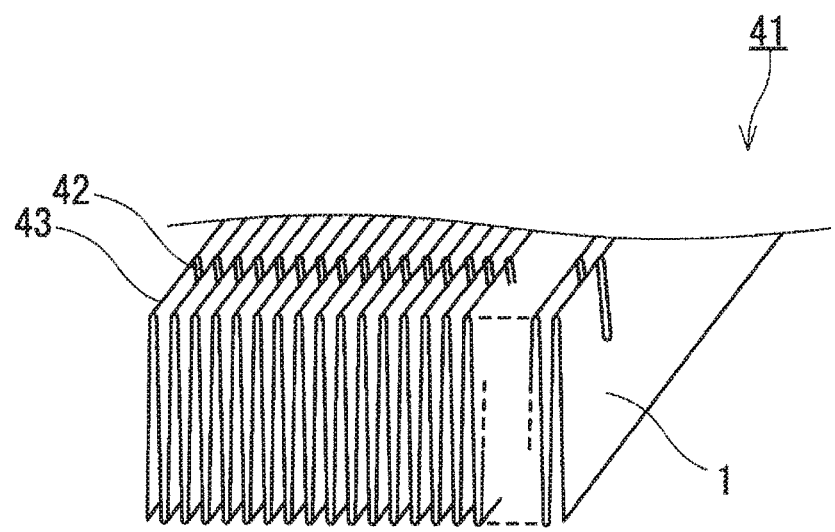
FIG. 6 is a perspective view schematically showing an example of the filter pleat pack of the present invention.

FIG. 6 shows an example of the filter pleat pack of the present invention. A filter pleat pack 41 shown in FIG. 6 is formed by pleating the air filter medium 1. The filter pleat pack 41 includes the air filter medium 1. The air filter medium 1 in the filter pleat pack 41 is folded so as to have a continuous W-shape as viewed from the side. By making the air filter medium 1 into the filter pleat pack 41, the filtration area with respect to the ventilation area (opening area of a frame) of an air filter unit when the filter pleat pack 41 is incorporated into the unit can be increased. In addition, since a decrease in collection efficiency during pleating can be inhibited in the air filter medium 1, the filter pleat pack 41 can exhibit a high collection efficiency.

The filter pleat pack of the present invention may further include any member other than the air filter medium 1. The filter pleat pack 41 shown in FIG. 6 further includes a string-shaped resin referred to as a bead 42. The bead 42 is a kind of spacer for maintaining the shape of the pleated air filter medium 1. The bead 42 is disposed on the surface of the folded air filter medium 1, for example, so as to extend along a direction crossing pleat lines 43 (the mountain folds and/or the valley folds) of the air filter medium 1. The bead 42 may be disposed on one surface of the air filter medium 1, or may be disposed on each surface of the air filter medium 1. However, the bead 42 is preferably disposed on the air-permeable support member 3, not on the porous PTFE membrane 2. The filter pleat pack 41 may include a plurality of beads 42 that are arranged parallel to each other at predetermined intervals in the direction of the pleat lines 43 in a plan view of the surface of the air filter medium 1 on which the beads 42 are arranged. However, the shape and the arrangement of the beads 42 are not limited to the above example. The beads 42 can be formed, for example, by melting a resin and applying the resin in a string shape. The resin is not limited, and examples of the resin include polyamides and polyolefins.

[Air Filter Unit]

Figure 7:
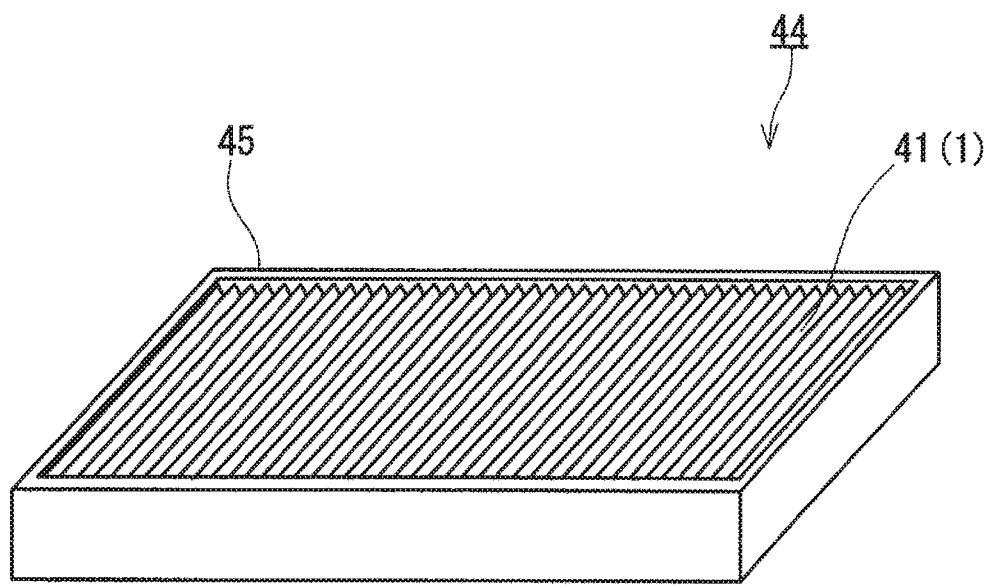
FIG. 7 is a perspective view schematically showing an example of the air filter unit of the present invention.

FIG. 7 shows an example of the air filter unit of the present invention. An air filter unit 44 shown in FIG. 7 includes the filter pleat pack 41 and a frame (supporting frame) 45 that supports the filter pleat pack 41. In the air filter unit 44, the periphery of the filter pleat pack 41 is supported by the frame 45. The frame 45 is formed from, for example, a metal, a resin, or a composite material thereof. In the case where the frame 45 is formed from a resin, it is also possible to fix the filter pleat pack 41 to the frame 45 at the same time as the frame 45 is formed. The configuration of the frame 45 may be the same as the configuration of a frame included in a conventional air filter unit.

EXAMPLES

Hereinafter, the present invention will be described in more detail by way of examples. The present invention is not limited to the examples described below.

First, methods for evaluating air filter media and filter pleat packs produced as Examples and Comparative Examples will be described.

[30%-Compression Repulsive Force of Air Filter Media]

Each of the air filter media produced in Examples and Comparative Examples was cut out into squares having a side of 25 mm, and 10 cut-out pieces of the medium were stacked with the outer periphery of each medium piece aligned. Next, a columnar compression element (diameter: 20 mm) with a weight of 12 g having a bottom surface as a compression surface was slowly placed on the uppermost surface of the stacked medium pieces such that the compression surface did not protrude from the uppermost surface. Next, while a compression load was applied to the compression element in the thickness direction of the medium using an autograph manufactured by Shimadzu Corporation to compress the medium pieces, stress received by the compression element from the medium pieces by the compression was measured as the repulsive force of the medium. The compression speed was set to 0.5 mm/min, the temperature of the measurement atmosphere was set to 25° C., and the relative humidity of the measurement atmosphere was set to 60%. The repulsive force of the medium measured when the compression element was pushed into the medium pieces by a distance of 30% of a thickness $d0$ of the entirety of the stacked medium pieces with the position of the compression element at the time when a load of 0.1 N was applied to the uppermost surface of the medium pieces without considering the mass of the compression element, as a reference position, was regarded as a "30%-compression repulsive force". The thickness $d0$ of the entirety of the stacked medium pieces was measured by a micrometer (manufactured by Mitutoyo Corporation).

[Maximum Coefficients of Friction of Surfaces of Air-Permeable Support Members in Air Filter Media]

The maximum coefficients of friction of the surfaces of the air-permeable support members in the respective air filter media produced in Examples and Comparative Examples were measured by a Bowden-Leben friction test method using a Bowden-Leben type friction tester (AFT-15B, manufactured by A&D Company, Limited) under the following conditions. The maximum coefficient of friction means the maximum value of the coefficient of friction (including both the coefficient of static friction and the coefficient of dynamic friction) measured by the above test method.

Shape of medium (test piece): 5 cm×10 cm rectangle
Gauge head: steel ball with a diameter of 10 mm specified in JIS B1501: 2009
Sliding direction of gauge head: long side direction of rectangular test piece
Sliding speed of gauge head: 700 mm/min
Sliding distance of gauge head: 40 mm
Measurement load: 100 gf

[Collection Efficiencies CE of Air Filter Media and Porous PTFE Membranes]

The collection efficiencies CE of the respective air filter media and porous PTFE membranes produced in Examples and Comparative Examples were measured as follows. First, an air filter medium or a porous PTFE membrane that is an object to be evaluated was set to a holder having a vent hole (with a circular shape and an effective area of 100 cm$^2$) such that the object to be evaluated closed the vent hole. Next, in a state where it was possible for air to pass only through the object to be evaluated within the vent hole, a pressure difference was generated between one surface and the other surface of the holder. Next, the pressure difference was adjusted such that the linear flow rate of the air passing through the object to be evaluated is maintained at 5.3 cm/sec as measured by a flow meter, and then polyalphaolefin particles having a particle diameter of 0.10 to 0.20 μm (average particle diameter: 0.15 μm) were included at a concentration (upstream particle concentration) of 4×10$^8$ particles/L or more in the air to be caused to pass through the object to be evaluated. The concentration (downstream particle concentration) of the polyalphaolefin particles included in the air having passed through the object to be evaluated was measured using a particle counter disposed downstream of the object to be evaluated, and the collection efficiency CE of the object to be evaluated was obtained by the following equation (2) from the upstream particle concentration and the downstream particle concentration.

$$\text{Collection efficiency CE}=[1-(\text{downstream particle concentration})/(\text{upstream particle concentration})]\times100(\%) \quad (2)$$

[Pressure Losses PL of Air Filter Media and Porous PTFE Membranes]

The pressure losses PL of the respective air filter media and porous PTFE membranes produced in Examples and Comparative Examples were evaluated as follows. First, an air filter medium or a porous PTFE membrane that is an object to be evaluated was set to a holder having a vent hole (with a circular shape and an effective area of 100 cm$^2$) such that the object to be evaluated closed the vent hole. Next, in a state where it was possible for air to pass only through the object to be evaluated within the vent hole, a pressure difference was generated between one surface and the other surface of the holder. Then, the pressure difference when the linear flow rate of the air passing through the object to be evaluated reached 5.3 cm/sec as measured by a flow meter was measured by a pressure gauge (manometer). The pressure difference was measured eight times for one object to be evaluated, and the average value of the pressure differences was regarded as the pressure loss PL of the object to be evaluated.

[PF Values of Air Filter Media and Porous PTFE Membranes]

The PF values of the respective air filter media and porous PTFE membranes produced in Examples and Comparative Examples were each obtained by the following equation (1) from the collection efficiency CE and the pressure loss PL obtained as described above. In the equation (1), the unit of the pressure loss PL is mmH$_2$O.

$$\text{PF value}=\{-\log\,[(100-\text{CE})/100]/\text{PL}\}\times100 \quad (1)$$

[Softening Point of Joining Component of Air-Permeable Support Member]

The softening point of the joining component of the air-permeable support member was obtained by a needle penetration test on the support member using a thermomechanical analyzer (TMA). Specifically, the TMA (TMA/SS120C, manufactured by Seiko Instruments Inc.) was set to a penetration mode, and the temperature at which a probe needle penetrated the air-permeable support member, which was an object to be measured, when the temperature of the atmosphere in which the air-permeable support member was placed was increased was regarded as the softening point of the joining component of the support member. The tip diameter of the probe needle was 1 mm, the load applied to the probe needle was set to 4 g, and the temperature rise rate was set to 5° C./min.

[Leak Test (Scan Test) and Overall Collection Efficiencies of Air Filter Media after Pleating]

A leak test of the air filter media after pleating and evaluation of overall collection efficiencies (overall collection efficiencies including parts of collection efficiencies decreased due to pleating) were performed under the following conditions with reference to the method specified in EN (European standard) 1822-1: 2009. However, instead of a collection efficiency with respect to a most penetrating particle size (MPPS), collection efficiencies obtained using polydisperse test particles (particle diameter: 0.1 μm or greater) were regarded as a local collection efficiency and an overall collection efficiency.

Test particles: PAO (polyalphaolefin)
Test particle diameter: 0.1 μm or greater
Upstream particle concentration: $1.0 \times 10^8$ particles/L or more
Face velocity: 0.4±0.1 m/sec
Filter unit size: 610 mm×610 mm In the leak test, according to the method specified in EN 1822-1: 2009, the downstream surface of an air filter unit produced using the air filter medium after pleating was scanned with a probe having a 50 mm×10 mm measurement opening at a speed of 22 mm/sec, and the number of PAO particles locally leaking downstream of the air filter unit was counted. As a result of the scan, the air filter unit having a region in which a collection efficiency (local collection efficiency: local collection efficiency=[1−(downstream particle concentration/upstream particle concentration)]×100%) decreased to less than 99.9900% was determined to have "leakage".

The same scan as in the leak test was performed on the air filter unit, the total number of PAO particles leaking at the downstream side in the entire area of the air filter unit was counted, a downstream particle concentration was calculated from the total number, and an overall collection efficiency was obtained from the upstream particle concentration and the calculated downstream particle concentration by the equation: overall collection efficiency=[1−(downstream particle concentration/upstream particle concentration)]×100%.

In each of Examples and Comparative Examples, 50 air filter units were produced from the air filter medium after pleating, and the leak test and evaluation of overall collection efficiency were performed on the respective air filter units produced. The results of the leak test are indicated as the number of air filter units determined to have "leakage" among the 50 air filter units produced. In addition, the overall collection efficiency of each of Examples and Comparative Examples was defined as the average value of the overall collection efficiencies exhibited by the respective 50 air filter units produced.

Example 1

A mixture was obtained by uniformly mixing 100 parts by weight of PTFE fine powder (POLYFLON F-104, manufactured by Daikin Industries, Ltd.) and 20 parts by weight of dodecane as a liquid lubricant. Next, a band-shaped PTFE sheet (thickness: 1.5 mm, width: 20 cm) was obtained by extruding the obtained mixture into a sheet shape using an extruder. Next, the formed PTFE sheet was rolled by a pair of metal rolling rolls. The rolling was performed while the PTFE sheet was pulled in the longitudinal direction thereof by using another roll disposed downstream of the rolling roll such that the width of the PTFE sheet did not change before and after the rolling. The thickness of the rolled PTFE sheet was 200 μm.

Next, the liquid lubricant was removed by keeping the PTFE sheet in an atmosphere of 150° C. Next, an unsintered porous PTFE membrane was obtained by stretching the PTFE sheet in the longitudinal direction thereof at a stretching temperature of 280° C. and a stretch ratio of 10 times by roll stretching and then stretching the PTFE sheet in the width direction thereof at a stretching temperature of 110° C. and a stretch ratio of 30 times by tenter stretching. Next, a band-shaped porous PTFE membrane 2A was obtained by sintering the obtained porous membrane at 400° C. using a hot-air furnace. The obtained porous PTFE membrane 2A had a pressure loss of 210 Pa, a collection efficiency of 99.999995%, and a PF value of 34.

Separately from the production of the porous PTFE membrane 2A, a band-shaped non-woven fabric 3A (Elves S0303WDO, manufactured by Unitika Ltd.) formed from PET/PE composite fibers was prepared as each air-permeable support member. The PET/PE composite fibers have a core-sheath structure including a PET core and a PE sheath. The joining component of the prepared air-permeable support member 3A is PE which forms the sheath and which has a lower melting point. The melting point of PE is 129° C., and the melting point of PET is 261° C. The softening point of PE which is the joining component was 74° C. The prepared non-woven fabric 3A had a thickness of 210 μm and a surface density (weight per unit area) of 30 g/m².

Figure 5:
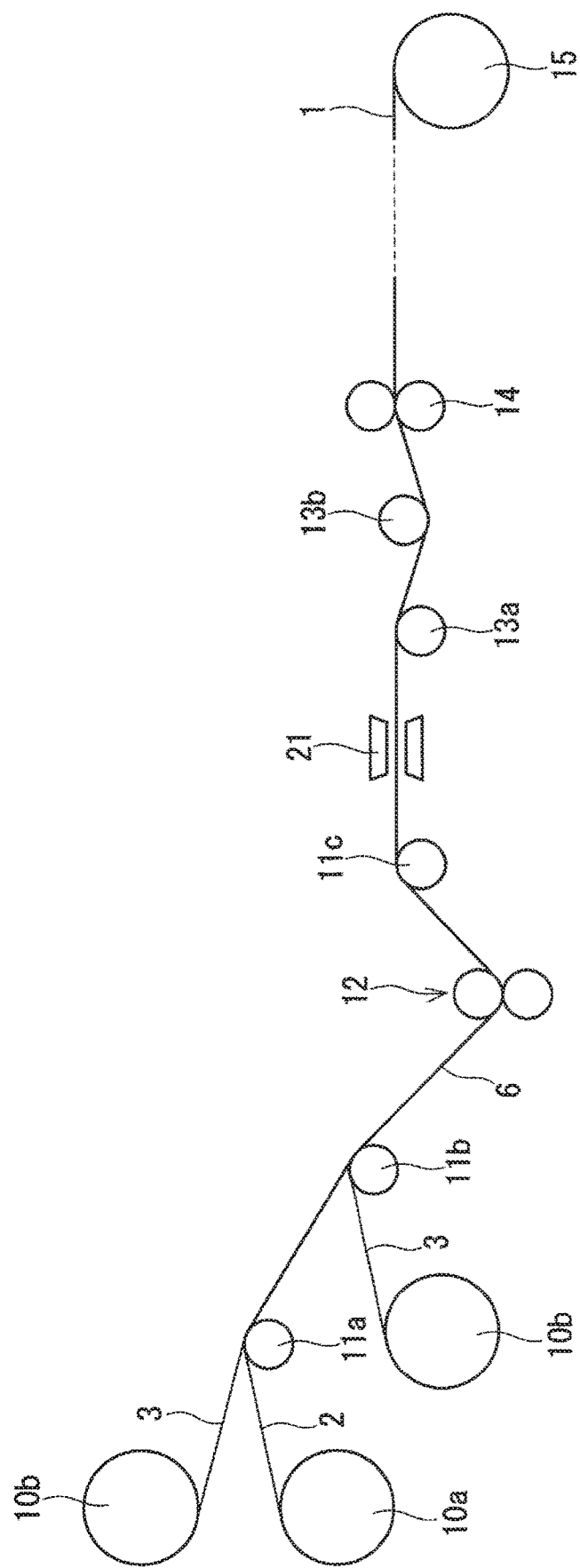
FIG. 5 is a schematic diagram showing another example of the method for producing the air filter medium of the present invention.

Next, an air filter medium 1A was obtained by performing heat lamination of the porous PTFE membrane 2A and the air-permeable support members 3A by the method shown in FIG. 5 such that the porous PTFE membrane 2A was sandwiched between a pair of the air-permeable support members 3A. The air filter medium 1A had a three-layer structure in which the porous PTFE membrane 2A and the pair of the air-permeable support members 3A sandwiching the porous PTFE membrane 2A therebetween were stacked. As the heating device 21, a near infrared heater (a short wavelength infrared heater, manufactured by Heraeus) was used. The temperature of the air-permeable support member 3A measured by a radiation thermometer immediately after passing through the near infrared heater was 145° C. Only one first cooling roll 13a (roll diameter: 100 mm) was disposed. The holding angle θ of the stack 6 passing through the first cooling roll 13a was controlled to 25 degrees, and the temperature of the surface, of the roll 13a, that was brought into contact with the stack 6 was controlled to 95° C. The holding angle θ of the stack 6 passing through the second cooling roll 13b (roll diameter: 100 mm) was controlled to 25 degrees, and the temperature of the surface, of the roll 13b, that was brought into contact with the stack 6 was controlled to 40° C. The ratio v2/v1 of the conveyance speed v2 by the second nip rolls 14 to the conveyance speed v1 by the first nip rolls 12 was controlled to 1.05.

The state of heat lamination of the porous PTFE membrane 2A and the pair of the air-permeable support members 3A in the obtained air filter medium 1A was good. The air filter medium 1A had a 30%-compression repulsive force of 135 kPa, a pressure loss of 212 Pa, a collection efficiency of 99.999923%, and a PF value of 28. Regarding the maximum coefficients of friction of the surfaces of the air-permeable support members 3A located at the outermost layers of the air filter medium 1A, the maximum coefficient of friction of the surface that was brought into contact with the first cooling roll 13a during production of the medium 1A was 16 gf, and the maximum coefficient of friction of the surface that was not brought into contact with the first cooling roll 13a during production of the medium 1A was 18 gf.

Next, the air filter medium 1A was pleated at a mountain height (pleat height) of 30 mm and a pleat interval of 8 ppi (pleats per inch) using a reciprocating pleating machine (manufactured by Faltec). A polyamide resin was used for a bead. Next, air filter units were each obtained by fixing the filter pleat pack obtained by the pleating, to an aluminum frame having an outer dimension of 610 mm×610 mm and an opening with a dimension of 580 mm×580 mm by an adhesive such that the four sides of the filter pleat pack adhered to the frame. The overall collection efficiency of the pleated air filter medium 1A in the obtained air filter units was 99.999952%, and the result of the leak test was 0 out of 50 units (0/50).

Example 2

An air filter medium 1B was obtained in the same manner as Example 1, except that the temperature of the surface, of the first cooling roll 13a, that was brought into contact with the stack 6 was changed from 95° C. to 80° C.

The state of heat lamination of the porous PTFE membrane 2A and the pair of the air-permeable support members 3A in the obtained air filter medium 1B was good. The air filter medium 1B had a 30%-compression repulsive force of 118 kPa, a pressure loss of 210 Pa, a collection efficiency of 99.999928%, and a PF value of 29. Regarding the maximum coefficients of friction of the surfaces of the air-permeable support members 3A located at the outermost layers of the air filter medium 1B, the maximum coefficient of friction of the surface that was brought into contact with the first cooling roll 13a during production of the medium 1B was 18 gf, and the maximum coefficient of friction of the surface that was not brought into contact with the first cooling roll 13a during production of the medium 1B was 19 gf.

Next, air filter units were each obtained in the same manner as Example 1, except that the produced air filter medium 1B was used instead of the air filter medium 1A. The overall collection efficiency of the pleated air filter medium 1B in the obtained air filter units was 99.999973%, and the result of the leak test was 0 out of 50 units (0/50).

Example 3

An air filter medium 1C was obtained in the same manner as Example 1, except that the ratio v2/v1 of the conveyance speed v2 by the second nip rolls 14 to the conveyance speed v1 by the first nip rolls 12 was changed from 1.05 to 0.98.

The state of heat lamination of the porous PTFE membrane 2A and the pair of the air-permeable support members 3A in the obtained air filter medium 1C was good. The air filter medium 1C had a 30%-compression repulsive force of 80 kPa, a pressure loss of 206 Pa, a collection efficiency of 99.999947%, and a PF value of 30. Regarding the maximum coefficients of friction of the surfaces of the air-permeable support members 3A located at the outermost layers of the air filter medium 1C, the maximum coefficient of friction of the surface that was brought into contact with the first cooling roll 13a during production of the medium 1C was 18 gf, and the maximum coefficient of friction of the surface that was not brought into contact with the first cooling roll 13a during production of the medium 1C was 20 gf.

Next, air filter units were each obtained in the same manner as Example 1, except that the produced air filter medium 1C was used instead of the air filter medium 1A. The overall collection efficiency of the pleated air filter medium 1C in the obtained air filter units was 99.999993%, and the result of the leak test was 0 out of 50 units (0/50).

Example 4

An air filter medium 1D was obtained in the same manner as Example 1, except that the ratio v2/v1 of the conveyance speed v2 by the second nip rolls 14 to the conveyance speed v1 by the first nip rolls 12 was changed from 1.05 to 0.94.

The state of heat lamination of the porous PTFE membrane 2A and the pair of the air-permeable support members 3A in the obtained air filter medium 1D was good. The air filter medium 1D had a 30%-compression repulsive force of 38 kPa, a pressure loss of 205 Pa, a collection efficiency of 99.999975%, and a PF value of 32. Regarding the maximum coefficients of friction of the surfaces of the air-permeable support members 3A which are the exposed surfaces of the air filter medium 1D, the maximum coefficient of friction of the surface that was brought into contact with the first cooling roll 13a during production of the medium 1D was 22 gf, and the maximum coefficient of friction of the surface that was not brought into contact with the first cooling roll 13a during production of the medium 1D was 23 gf Next, air filter units were each obtained in the same manner as Example 1, except that the produced air filter medium 1D was used instead of the air filter medium 1A. The overall collection efficiency of the pleated air filter medium 1D in the obtained air filter units was 99.999995%, and the result of the leak test was 0 out of 50 units (0/50).

Example 5

An air filter medium 1E was obtained in the same manner as Example 1, except that a band-shaped non-woven fabric 3B (Elves S0403WDO, manufactured by Unitika Ltd.) formed from PET/PE composite fibers was used as each air-permeable support member instead of the non-woven fabric 3A. The non-woven fabric 3B has the same configuration as the non-woven fabric 3A, except that the surface density is 40 g/m$^2$. The temperature of the air-permeable support member 3B measured by a radiation thermometer immediately after passing through the near infrared heater which is the heating device 21 was 136° C.

The state of heat lamination of the porous PTFE membrane 2A and the pair of the air-permeable support members 3B in the obtained air filter medium 1E was good. The air filter medium 1E had a 30%-compression repulsive force of 127 kPa, a pressure loss of 213 Pa, a collection efficiency of 99.999976%, and a PF value of 30. Regarding the maximum coefficients of friction of the surfaces of the air-permeable support members 3B located at the outermost layers of the air filter medium 1E, the maximum coefficient of friction of the surface that was brought into contact with the first cooling roll 13a during production of the medium 1E was 16 gf, and the maximum coefficient of friction of the surface that was not brought into contact with the first cooling roll 13a during production of the medium 1E was 18 gf.

Next, air filter units were each obtained in the same manner as Example 1, except that the produced air filter medium 1E was used instead of the air filter medium 1A. The overall collection efficiency of the pleated air filter medium 1E in the obtained air filter units was 99.999998%, and the result of the leak test was 0 out of 50 units (0/50).

Example 6

A mixture was obtained by uniformly mixing 100 parts by weight of PTFE fine powder (POLYFLON F-104, manufactured by Daikin Industries, Ltd.) and 19 parts by weight of dodecane as a liquid lubricant. Next, a band-shaped PTFE sheet (thickness: 1.5 mm, width: 20 cm) was obtained by extruding the obtained mixture into a sheet shape using an extruder. Next, the formed PTFE sheet was rolled by a pair of metal rolling rolls. The rolling was performed while the PTFE sheet was pulled in the longitudinal direction thereof by using another roll disposed downstream of the rolling roll such that the width of the PTFE sheet did not change before and after the rolling. The thickness of the rolled PTFE sheet was 200 μm.

Next, the rolled PTFE sheet was stretched in the width direction thereof at a stretching temperature of 25° C. and a stretch ratio of 4 times by tenter stretching in a state where the PTFE sheet contained the liquid lubricant. Next, the liquid lubricant was removed by keeping the stretched PTFE sheet in an atmosphere of 150° C. Next, an unsintered porous PTFE membrane was obtained by stretching the PTFE sheet, from which the liquid lubricant had been removed, in the longitudinal direction thereof at a stretching temperature of 280° C. and a stretch ratio of 12 times by roll stretching and then stretching the PTFE sheet in the width direction thereof at a stretching temperature of 110° C. and a stretch ratio of 30 times by tenter stretching. Next, a band-shaped porous PTFE membrane 2B was obtained by sintering the obtained porous membrane at 400° C. using a hot-air furnace. The obtained porous PTFE membrane 2B had a pressure loss of 210 Pa, a collection efficiency of 99.999999%, and a PF value of 37.

Next, an air filter medium 1F was obtained in the same manner as Example 1, except that the produced porous PTFE membrane 2B was used instead of the porous PTFE membrane 2A.

The state of heat lamination of the porous PTFE membrane 2B and the pair of the air-permeable support members 3A in the obtained air filter medium 1F was good. The air filter medium 1F had a 30%-compression repulsive force of 132 kPa, a pressure loss of 212 Pa, a collection efficiency of 99.999993%, and a PF value of 33. Regarding the maximum coefficients of friction of the surfaces of the air-permeable support members 3A located at the outermost layers of the air filter medium 1F, the maximum coefficient of friction of the surface that was brought into contact with the first cooling roll 13a during production of the medium 1F was 16 gf, and the maximum coefficient of friction of the surface that was not brought into contact with the first cooling roll 13a during production of the medium 1F was 18 gf.

Next, air filter units were each obtained in the same manner as Example 1, except that the produced air filter medium 1F was used instead of the air filter medium 1A. The overall collection efficiency of the pleated air filter medium 1F in the obtained air filter units was 99.999995%, and the result of the leak test was 0 out of 50 units (0/50).

Comparative Example 1

The porous PTFE membrane 2A and the air-permeable support members 3A used in Example 1 were prepared. Next, an air filter medium C1 was obtained by performing heat lamination of the porous PTFE membrane 2A and the air-permeable support members 3A using a heat roll such that a pair of the air-permeable support members 3A sandwiched the porous PTFE membrane 2A therebetween. The air filter medium C1 has a three-layer structure in which the porous PTFE membrane 2A and the pair of the air-permeable support members 3A sandwiching the porous PTFE membrane 2A therebetween are stacked. The temperature of the heat roll used for the heat lamination was set to 135° C.

The state of heat lamination of the porous PTFE membrane 2A and the pair of the air-permeable support members 3A in the obtained air filter medium C1 was good. The air filter medium C1 had a 30%-compression repulsive force of 165 kPa, a pressure loss of 216 Pa, a collection efficiency of 99.999928%, and a PF value of 28. Regarding the maximum coefficients of friction of the surfaces of the air-permeable support members 3A located at the outermost layers of the air filter medium C1, the maximum coefficient of friction of one of the surfaces was 28 gf, and the maximum coefficient of friction of the other surface was 27 gf.

Next, air filter units were each obtained in the same manner as Example 1, except that the produced air filter medium C1 was used instead of the air filter medium 1A. The overall collection efficiency of the pleated air filter medium C1 in the obtained air filter units was 99.999915%, and the result of the leak test was 2 out of 50 units (2/50).

Comparative Example 2

An air filter medium C2 was obtained in the same manner as Example 1, except that the ratio v2/v1 of the conveyance speed v2 by the second nip rolls 14 to the conveyance speed v1 by the first nip rolls 12 was changed from 1.05 to 1.2.

The state of heat lamination of the porous PTFE membrane 2A and the pair of the air-permeable support members 3A in the obtained air filter medium C2 was good. The air filter medium C2 had a 30%-compression repulsive force of 166 kPa, a pressure loss of 212 Pa, a collection efficiency of 99.999915%, and a PF value of 28. Regarding the maximum coefficients of friction of the surfaces of the air-permeable support members 3A located at the outermost layers of the air filter medium C2, the maximum coefficient of friction of the surface that was brought into contact with the first cooling roll 13a during production of the medium C2 was 15 gf, and the maximum coefficient of friction of the surface that was not brought into contact with the first cooling roll 13a during production of the medium C2 was 16 gf.

Next, air filter units were each obtained in the same manner as Example 1, except that the produced air filter medium C2 was used instead of the air filter medium 1A. The overall collection efficiency of the pleated air filter medium C2 in the obtained air filter units was 99.999890%, and the result of the leak test was 2 out of 50 units (2/50).

Comparative Example 3

Production of an air filter medium C3 was attempted in the same manner as Example 1, except that the ratio v2/v1 of the conveyance speed v2 by the second nip rolls 14 to the conveyance speed v1 by the first nip rolls 12 was changed from 1.05 to 0.85. However, the air filter medium C3 was not able to be stably obtained due to deflection of the stack 6 in the heating section between the first nip rolls 12 and the second nip rolls 14. Ten pieces of the fragmentarily obtained air filter medium C3 were stacked, and only evaluation of 30%-compression repulsive force was performed for the medium C3. The 30%-compression repulsive force of the air filter medium C3 was 29 kPa.

Comparative Example 4

An air filter medium C4 was obtained in the same manner as Example 1, except that the temperature of the surface, of the first cooling roll 13a, that was brought into contact with the stack 6 was changed from 95° C. to 25° C. and the temperature of the surface, of the second cooling roll 13b, that was brought into contact with the stack 6 was changed from 40° C. to 25° C.

The state of heat lamination of the porous PTFE membrane 2A and the pair of the air-permeable support members 3A in the obtained air filter medium C4 was a state wherein heat lamination was achieved but the joining strength therebetween was low and a region where the porous PTFE membrane 2A and the air-permeable support member 3A were not jointed to each other was partially present. The air filter medium C4 had a 30%-compression repulsive force of 125 kPa, a pressure loss of 210 Pa, a collection efficiency of 99.999931%, and a PF value of 29. Regarding the maximum coefficients of friction of the surfaces of the air-permeable support members 3A located at the outermost layers of the air filter medium C4, the maximum coefficient of friction of the surface that was brought into contact with the first cooling roll 13a during production of the medium C4 was 25 gf, and the maximum coefficient of friction of the surface that was not brought into contact with the first cooling roll 13a during production of the medium C4 was 27 gf.

Next, air filter units were each obtained in the same manner as Example 1, except that the produced air filter medium C4 was used instead of the air filter medium 1A. The overall collection efficiency of the pleated air filter medium C4 in the obtained air filter units was 99.999905%, and the result of the leak test was 8 out of 50 units (8/50).

Comparative Example 5

An air filter medium C5 was obtained in the same manner as Comparative Example 1, except that the non-woven fabric 3B used in Example 5 was used as each air-permeable support member instead of the non-woven fabric 3A The state of heat lamination of the porous PTFE membrane 2A and the pair of the air-permeable support members 3B in the obtained air filter medium C5 was good. The air filter medium C5 had a 30%-compression repulsive force of 172 kPa, a pressure loss of 225 Pa, a collection efficiency of 99.999978%, and a PF value of 29. Regarding the maximum coefficients of friction of the surfaces of the air-permeable support members 3B which are the exposed surfaces of the air filter medium C5, the maximum coefficient of friction of one of the surfaces was 28 gf and the maximum coefficient of friction of the other surface was 27 gf.

Next, air filter units were each obtained in the same manner as Example 1, except that the produced air filter medium C5 was used instead of the air filter medium 1A. The overall collection efficiency of the pleated air filter medium C5 in the obtained air filter units was 99.999973%, and the result of the leak test was 1 out of 50 units (1/50).

Comparative Example 6

An air filter medium C6 was obtained in the same manner as Comparative Example 1, except that the porous PTFE membrane 2B used in Example 6 was used as a porous PTFE membrane instead of the porous membrane 2A.

The state of heat lamination of the porous PTFE membrane 2B and the pair of the air-permeable support members 3A in the obtained air filter medium C6 was good. The air filter medium C6 had a 30%-compression repulsive force of 161 kPa, a pressure loss of 216 Pa, a collection efficiency of 99.999993%, and a PF value of 32. Regarding the maximum coefficients of friction of the surfaces of the air-permeable support members 3A located at the outermost layers of the air filter medium C6, the maximum coefficient of friction of one of the surfaces was 28 gf and the maximum coefficient of friction of the other surface was 27 gf.

Next, air filter units were each obtained in the same manner as Example 1, except that the produced air filter medium C6 was used instead of the air filter medium 1A. The overall collection efficiency of the pleated air filter medium C6 in the obtained air filter units was 99.999908%, and the result of the leak test was 6 out of 50 units (6/50).

Table 1 summarizes the production conditions of the air filter media in Examples and Comparative Examples, and Table 2 summarizes the results of Examples and Comparative Examples. In each of cells of "Maximum coefficient of friction" in Table 2, regarding the maximum coefficients of friction of the surfaces of the air-permeable support members located at the outermost layers of a produced air filter medium, the value of the surface brought into contact with the first cooling roll or one surface brought into contact with the heat roll during production of the medium is shown at the left side of "/", and the value of the surface not brought into contact with the first cooling roll or the other surface brought into contact with the heat roll during production of the medium is shown at the right side of "/". In addition, in each of cells of "Leak test result" in Table 2, regarding the results of the leak test after pleating, the number X of units determined to have "leakage" among 50 air filter units produced in each of Examples and Comparative Examples is indicated as "X/50".

TABLE 1

| | Porous PTFE membrane | Air-permeable support member | Surface density of air-permeable support member (g/m²) | Heat lamination method | Temperature of surface, of first cooling roll, brought into contact with stack (° C.) | Temperature of surface, of second cooling roll, brought into contact with stack (° C.) | Nip roll speed ratio v1/v2 |
|---|---|---|---|---|---|---|---|
| Ex. 1 | 2A | 3A | 30/30 | Infrared | 95 | 40 | 1.05 |
| Ex. 2 | 2A | 3A | 30/30 | heating + | 80 | 40 | 1.05 |
| Ex. 3 | 2A | 3A | 30/30 | first cooling | 95 | 40 | 0.98 |
| Ex. 4 | 2A | 3A | 30/30 | roll | 95 | 40 | 0.94 |
| Ex. 5 | 2A | 3B | 40/40 | | 95 | 40 | 1.05 |
| Ex. 6 | 2B | 3A | 30/30 | | 95 | 40 | 1.05 |
| Comp. Ex. 1 | 2A | 3A | 30/30 | Heat roll | — | — | — |

TABLE 1-continued

|  | Porous PTFE membrane | Air-permeable support member | Surface density of air-permeable support member (g/m²) | Heat lamination method | Temperature of surface, of first cooling roll, brought into contact with stack (° C.) | Temperature of surface, of second cooling roll, brought into contact with stack (° C.) | Nip roll speed ratio v1/v2 |
|---|---|---|---|---|---|---|---|
| Comp. Ex. 2 | 2A | 3A | 30/30 | Infrared heating + first cooling roll | 95 | 40 | 1.20 |
| Comp. Ex. 3 | 2A | 3A | 30/30 | | 95 | 40 | 0.85 |
| Comp. Ex. 4 | 2A | 3A | 30/30 | | 25 | 25 | 1.05 |
| Comp. Ex. 5 | 2A | 3B | 40/40 | Heat roll | — | — | — |
| Comp. Ex. 6 | 2B | 3A | 30/30 | | — | — | — |

TABLE 2

| | Air filter medium (before pleating) | | | | | Air filter medium (after pleating) | |
|---|---|---|---|---|---|---|---|
| | Laminate state | 30%-compression repulsive force (kPa) | Maximum coefficient of friction (gf) | Collection efficiency (%) | Pressure loss (Pa) | PF value | Collection efficiency (%) | Leak test result |
| Ex. 1 | Good | 135 | 16/18 | 99.999923 | 212 | 28 | 99.999952 | 0/50 |
| Ex. 2 | Good | 118 | 18/19 | 99.999928 | 210 | 29 | 99.999973 | 0/50 |
| Ex. 3 | Good | 80 | 18/20 | 99.999947 | 206 | 30 | 99.999993 | 0/50 |
| Ex. 4 | Good | 38 | 22/23 | 99.999975 | 205 | 32 | 99.999995 | 0/50 |
| Ex. 5 | Good | 127 | 16/18 | 99.999976 | 213 | 30 | 99.999998 | 0/50 |
| Ex. 6 | Good | 132 | 16/18 | 99.999993 | 212 | 33 | 99.999995 | 0/50 |
| Comp. Ex. 1 | Good | 165 | 28/27 | 99.999928 | 216 | 28 | 99.999915 | 2/50 |
| Comp. Ex. 2 | Good | 166 | 15/16 | 99.999915 | 212 | 28 | 99.999890 | 2/50 |
| Comp. Ex. 3 | Poor | 29 | — | — | — | — | — | — |
| Comp. Ex. 4 | Fair | 125 | 25/27 | 99.999931 | 210 | 29 | 99.999905 | 8/50 |
| Comp. Ex. 5 | Good | 172 | 28/27 | 99.999978 | 225 | 29 | 99.999973 | 1/50 |
| Comp. Ex. 6 | Good | 161 | 28/27 | 99.999993 | 216 | 32 | 99.999908 | 6/50 |

As shown in Table 2, as compared to the air filter media of Comparative Examples, in the air filter media of Examples, a decrease in collection efficiency (overall collection efficiency) due to pleating was inhibited and leakage which is local damage during pleating was also not observed. Among Examples 1 to 4 in which the same porous PTFE membrane and air-permeable support members were used, a decrease in collection efficiency due to pleating was particularly inhibited in the air filter media of Examples 3 and 4 in which the nip roll speed ratio v1/v2 during production of the medium was set to be equal to or less than 1.

Although the porous PTFE membrane 2B having a high PF value was used in each of the air filter media of Example 6 and Comparative Example 6, a significant decrease in collection efficiency due to pleating was observed and leakage occurred frequently in the air filter medium of Comparative Example 6.

The present invention may be embodied in other forms without departing from the spirit or essential characteristics thereof. The embodiments disclosed in this specification are to be considered in all respects as illustrative and not limiting. The scope of the present invention is indicated by the appended claims rather than by the foregoing description, and all changes which come within the meaning and range of equivalency of the claims are intended to be embraced therein.

INDUSTRIAL APPLICABILITY

The air filter medium of the present invention can be used in the same application as a conventional air filter medium. Examples of the application include application to air filter media, filter pleat packs, and air filter units that are used in air filters for clean rooms used in the semiconductor industry, the pharmaceutical industry etc.

DESCRIPTION OF THE REFERENCE CHARACTERS

1 air filter medium
2, 2a, 2b porous PTFE membrane
3, 3a, 3b, 3c air-permeable support member
4 stack 5a, 5b main surface
6 stack
10a, 10b feed roll
11a, 11b, 11c guide roll
12 first nip roll
13a first cooling roll
13b second cooling roll
14 second nip roll
15 winding roll
21 heating device
22 infrared source
31 roll
32 conveyance object
33 point
34 line segment
35 point
36 line segment
41 filter pleat pack
42 bead
43 pleat line
44 air filter unit
45 frame

The invention claimed is:

1. An air filter medium, comprising:
a stack of a porous polytetrafluoroethylene (PTFE) membrane and an air-permeable support member, wherein
a repulsive force generated in the air filter medium when the air filter medium is compressed in a thickness direction thereof is equal to or greater than 30 kPa and equal to or less than 150 kPa at a compression ratio of 30%, and
at least one main surface of the air filter medium is formed by the air-permeable support member and has a maximum friction force of 24 gf or less; and
wherein
the compression ratio of 30% is measured by:
stacking pieces of the air filter medium to provide stacked medium pieces having a total thickness,
compressing, with a compression element, the stacked medium pieces by a distance of 30% of the total thickness in the thickness direction,
wherein a reference position from which compression of the stacked medium pieces starts is defined by a position of the compression element at a time when a load of 0.1 N is applied to an uppermost surface of the stacked medium pieces, the load of 0.1 N excluding the mass of the compression element.

2. The air filter medium according to claim 1, wherein
the air filter medium has a PF value of 23 or greater, and
the PF value is a value obtained by the following equation (1) from a pressure loss PL (mmH$_2$O) of the air filter medium at a permeate flow rate of 5.3 cm/sec and a collection efficiency CE (%) of the air filter medium measured at a permeate flow rate of 5.3 cm/sec using polyalphaolefin particles having a particle diameter of 0.10 to 0.20 μm, $$\text{PF value} = \{-\log[(100-CE)/100]/PL\} \times 100 \qquad (1).$$

3. The air filter medium according to claim 2, wherein the PF value is equal to or greater than 30.

4. The air filter medium according to claim 1, wherein the air filter medium has a surface density equal to or greater than 55 g/m$^2$ and equal to or less than 95 g/m$^2$.

5. The air filter medium according to claim 1, wherein the air filter medium has a surface density equal to or greater than 55 g/m$^2$ and equal to or less than 75 g/m$^2$.

6. The air filter medium according to claim 1, wherein
the stack includes two or more air-permeable support members, and
both main surfaces of the air filter medium are formed by the air-permeable support members.

7. A filter pleat pack comprising an air filter medium folded in a pleated manner, wherein
the pleated air filter medium is the air filter medium according to claim 1.

8. An air filter unit comprising the filter pleat pack according to claim 7 and a frame supporting the filter pleat pack.

* * * * *